(12) United States Patent
Apte et al.

(10) Patent No.: US 6,395,206 B1
(45) Date of Patent: May 28, 2002

(54) METHOD OF REMOVING AN ORGANIC BINDER FROM A GREEN CERAMIC FORM

(75) Inventors: Prasad Apte; Ravi Prasad, both of East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/586,897

(22) Filed: Jun. 5, 2000

(51) Int. Cl.[7] ............................................... C04B 33/32
(52) U.S. Cl. ........................ 264/82; 264/656; 264/234
(58) Field of Search ............................ 264/656, 82, 234

(56) References Cited

U.S. PATENT DOCUMENTS

| | | | |
|---|---|---|---|
| 4,234,367 A | 11/1980 | Herron et al. | 156/89 |
| 4,305,756 A | 12/1981 | Wiech, Jr. | 75/211 |
| 4,530,808 A | 7/1985 | Renlund et al. | 264/63 |
| 4,622,240 A | 11/1986 | Yext et al. | 427/96 |
| 4,661,315 A | 4/1987 | Wiech, Jr. | 419/10 |
| 4,704,242 A | 11/1987 | Bandyopadhyay et al. | 264/234 |
| 4,708,838 A | 11/1987 | Bandyopadhyay et al. | 264/63 |
| 4,994,436 A | 2/1991 | Giacobbe | 505/1 |
| 5,302,412 A | 4/1994 | Tamhankar et al. | 427/102 |
| 5,578,257 A | 11/1996 | Van den Sype | 264/40.1 |

FOREIGN PATENT DOCUMENTS

EP  216436  4/1989

OTHER PUBLICATIONS

Van Dijen, "The Production of Ceramics and the Gasification of Carbon", European Ceramics Society, vol. 1 (1989) pp 1.356–1.365.

*Primary Examiner*—C A Fiorilla
(74) *Attorney, Agent, or Firm*—David M. Rosenblum

(57) ABSTRACT

A method of removing an organic binder from a green ceramic form in which a green ceramic form is subjected to a flowing carbon dioxide containing atmosphere having a sufficiently low oxygen content to allow about 60% or more of the organic binder to be oxidized by carbon dioxide. The green ceramic form is heated to the oxidation temperature at a rate greater than about 0.1° C. and is maintained under oxidizing temperature conditions until at least about 90% of the organic binder oxidizes.

15 Claims, 2 Drawing Sheets

METHOD OF REMOVING AN ORGANIC BINDER FROM A GREEN CERAMIC FORM

TECHNICAL FIELD

The present invention relates to a method of removing an organic binder from a green ceramic form by oxidation of the organic binder system. More particularly, the present invention relates to such a method in which the organic binder system is oxidized in a flowing carbon dioxide containing atmosphere.

BACKGROUND ART

Ceramic articles are manufactured by mixing ceramic particles with organic binder systems and shaped into a desired form. The shaped ceramic is called a green ceramic. Thereafter, the green ceramic is fired to burn out the binder and sintered to form a solid mass.

The binder removal step is particularly critical in the manufacture of ceramic membranes. Ceramic membranes are thin walled ceramics, which can be in the form of tubes, that exhibit ion conductivity at high temperatures. Such membranes have been used within reactors for oxygen and hydrogen separations. In the practice currently employed, the binder is removed in an oxygen containing atmosphere by slow heating, less than a tenth of a degree per minute and over extended periods of time that can reach 96 hours. The slow processing rates can make the manufacture of such membranes economically unfeasible.

If the binder were burned out rapidly, it would inevitably result in breakage of the membranes. Binders are generally organic, for instance, polyethylene, methyl cellulose or polymethyl methacrylates. During heating, the binder is oxidized in air, under an exothermic reaction with oxygen, to form a gaseous mixture of carbon dioxide and water vapor. The heat released under such conditions tends to increase the combustion rate which in turn releases even more heat. If the green ceramic were heated rapidly there would be a loss of control and a thermal runaway that would cause breakage of the ceramic through the rapid expansion of the gaseous reaction products. In order to avoid this, the carbon dioxide and water vapor have to be allowed to evolve very slowly and hence, the long processing times.

Some binders, for instance, polyethylene glycol, can be removed by volatilization in a flowing atmosphere of an inert gas. The problem with such processing is that often a carbonaceous residue is left in the membrane. At the high temperatures at which ceramic membranes have to be sintered, such residue will seek oxygen from the ceramic itself to damage the ceramic. In order to prevent this, U.S. Pat. No. 4,994,436 provides a processing atmosphere in which the binder is removed in an inert processing atmosphere followed by a mild oxidizing atmosphere to remove trace amounts of carbon within the membrane. The mild oxidizing atmosphere can contain a mixture of nitrogen and up to 50% carbon dioxide to burn out carbonaceous deposits at temperatures in excess of 900° C. Similarly, in F. K. Van Diejen, Euro Ceramics Vol. 1. Processing of Ceramics, P 1356 to 1365, European Ceramic Society, carbon residues are removed from ceramics in a carbon dioxide containing atmosphere and at temperatures in excess of 800° C. Also relevant is U.S. Pat. No. 4,622,240 which discloses a firing atmosphere containing nitrous oxide to reduce soot formation.

In all of the forgoing references, the carbon dioxide or nitrous oxide containing atmosphere is used to endothermically oxidize carbon residues as opposed to the binders contained within the green ceramic to be fired. Organic binders have been removed in carbon dioxide containing atmospheres in applications other than the firing of free-standing ceramic bodies. For instance, in U.S. Pat. No. 5,302,412 a single carbon dioxide containing atmosphere is used to burn out binders in a thick film materials applied to substrates as inks to form electronic circuitry. The thick film materials consist of electrical component materials used to form conductors, resistors, and capacitors mixed with organic binder systems. As may be appreciated, there is so little thermal mass involved that heating times are typically between 5 to 15 minutes. Furthermore, since the thick film material is supported on a substrate, problems such as breakage and cracking are reduced.

As will be discussed, the present invention provides a method of removing a binder from a green ceramic form that can be accomplished at a more rapid pace than prior art techniques and without damage to the ceramic.

SUMMARY OF THE INVENTION

The present invention provides a method of removing an organic binder from a green ceramic form. The term "ceramic form" as used herein and in the claims means a shaped ceramic, such as of single or multilayered configuration, in a form comprising tubes, plates, and etc. as opposed to ceramics that are bonded to a supporting substrate such as in U.S. Pat. No. 5,302,412. In accordance with the present invention, the green ceramic form is subjected to a flowing carbon dioxide containing atmosphere having a sufficiently low oxygen content to allow at least about 60% of the organic binder to be oxidized by carbon dioxide if all of the organic binder were oxidized. The green ceramic form is heated at a rate greater than about 0.1° C. per minute to an oxidation temperature (or burn-out temperature) at which the organic binder will oxidize. The green ceramic form is maintained under oxidizing temperature conditions until at least about 90% and preferably at least about 99% by weight of the organic binder is oxidized and thus, removed within the carbon dioxide containing atmosphere.

In a process in accordance with the present invention breakage of the ceramic and/or thermal runaway is avoided by using carbon dioxide to constrain the oxidation to take place under anywhere from slightly exothermic, thermally neutral, on balance endothermic, or entirely endothermic oxidation conditions. Where some oxygen is present, the reaction can be slightly exothermic, thermally neutral or on balance endothermic. When essentially no oxygen is present, the reaction conditions will be entirely exothermic. The present invention is intended to cover all of such possibilities.

In a carbon dioxide containing atmosphere that contains a sufficiently low oxygen content to allow at least about 60% of the organic binder to be oxidized by the carbon dioxide, it is ensured that oxidation will take place under slightly exothermic conditions. In this regard, such slightly exothermic conditions can be obtained in an atmosphere that contains about 10% oxygen and about 90% carbon dioxide. Hence, slightly exothermic conditions are ensured in a carbon dioxide containing atmosphere that contains no less than about 90% carbon dioxide by volume and no more than about 10% oxygen by volume.

The oxidation of the organic binder can be anywhere thermally neutral to on balance endothermic when there is some oxygen present, such as by air leakage in a furnace, so that some of the oxidation of the organic binder is exothermic while most of the oxidation is endothermic. As the amount of oxygen content in the carbon dioxide containing atmosphere falls, the oxidation increasingly takes place with carbon dioxide so that reaction conditions become more endothermic and entirely endothermic when essentially no oxygen present. With respect to air infiltration into a treatment furnace, at carbon dioxide concentrations of over about 70% by volume, equilibrium calculations suggest that where the remainder of the atmosphere consists of air the oxidation of the organic binder will remain on balance endothermic. A treatment atmosphere containing about 60% by volume carbon dioxide is advantageous because even if the remainder of the atmosphere is air, the oxidation of the organic binder will proceed at least under thermally neutral conditions.

A preferred atmosphere is one containing at least 30% $CO_2$ by volume while the remaining components could be other inert gases such as nitrogen argon and etc. This being said, far lower concentrations of carbon dioxide are possible where the balance of the atmosphere is inert, for example 1% carbon dioxide, the remainder nitrogen or argon. Thus, a process in accordance with the present invention can be conducted with carbon dioxide concentrations being anywhere from about 1% to about 100%. As the concentration of carbon dioxide rises, the obvious disadvantage is the costs involved in supplying the carbon dioxide.

As stated previously, the advantage of the present invention is that much shorter processing times can be realized. In this regard, the rate of temperature increase of the ceramic during heating is preferably no greater than about 50° C./min. However, since in conventional furnaces it is not possible to heat the ceramic at such a rapid rate, a heating rate of no greater than about 20° C. /min. is more practical with a heating rate ranging from between about 5° C. and about 15° C. /min. being particularly preferred for safety and operational control purposes.

The oxidation temperature to which the green ceramic form is heated will range between about 200° C. and about 800° C. depending upon the particular binder system used. As may be appreciated, at very low temperatures, there may be oxidation. However, the oxidation occurs at such a low rate as to make such temperatures unattractive from a temporal standpoint. At higher temperatures, oxidation of all of the organic binder is virtually assured. However, such high end temperatures are not ordinarily required and therefore, a more practical oxidation temperature range that encompasses many common binder systems is between about 450° C. and about 650° C. An oxidation temperature of about 600° C. is particularly preferred as a common operational condition of ceramic treatment furnaces.

As stated above, in a process in accordance with the present invention, the green ceramic form is maintained under oxidizing temperature conditions which are not necessarily at the oxidation temperature to which the green ceramic form is initially heated. For instance, once the green ceramic form is heated to the oxidation temperature, it can be maintained at such temperature or further heated or even allowed to cool somewhat provided that the temperature of the ceramic is maintained within a practical temperature range for the oxidation of the organic binder. For example, depending of course on the particular binder system used, ceramic temperatures might be made to vary during oxidation from between about 200° C. and about 800° C.

The time period for maintaining the green ceramic form under such oxidizing temperature conditions can be between about 0.1 and about 30 hours. The time period will of course vary with the size, composition, and thickness of the ceramic as well as the organic binder used. A time period of about 10 hours is projected for a typical oxygen-selective, ceramic membrane of tubular configuration having a wall thickness of about 1.5 mm. Longer time periods will give even greater assurance that the carbon and/or organic binder residue is completely removed.

As stated previously, the method of the present invention has particular application to ceramics formed of an oxide or mixture of oxides that conduct hydrogen or oxygen ions. Perovskites of the type used in oxygen transport membranes are capable of uptaking or losing oxygen to the atmosphere depending on the temperature and pressure. Because of this as well as the thermal gradients, compositional and thermal stresses can be created in the ceramic body. Carbon dioxide provides a preferred environment that helps reduce or eliminate the above stated stresses and furthermore, helps simplify the overall process. This fact enables rapid sintering of these materials to even further reduce processing times.

BRIEF DESCRIPTION OF THE DRAWINGS

While the specification concludes with claims distinctly pointing out the subject matter that Applicants regard as their invention, it is believed the invention will be better understood when taken in connection with the accompanying drawings in which:

DETAILED DESCRIPTION

Figure 1:
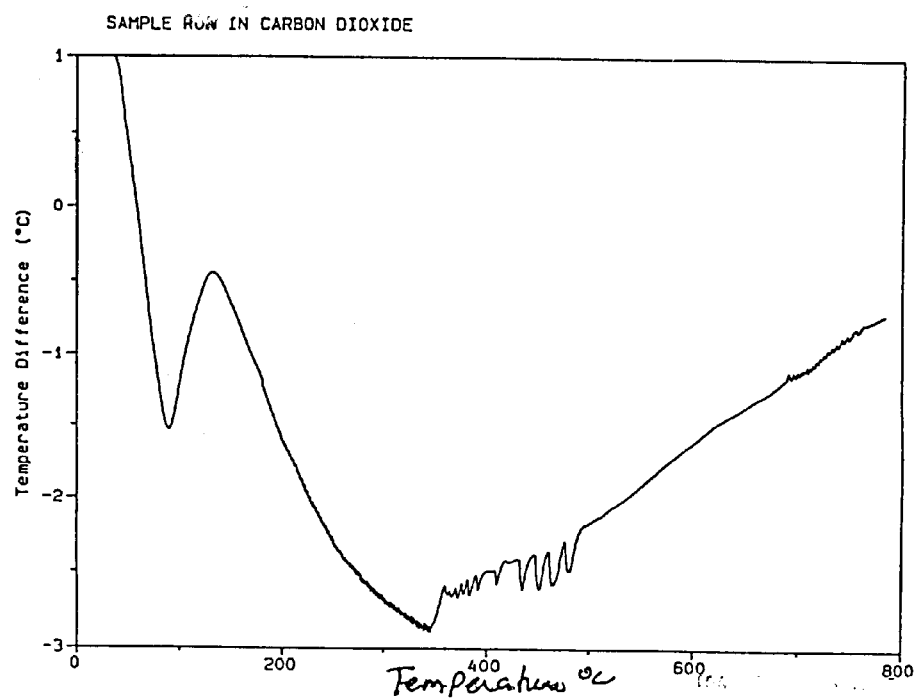
FIG. 1 is a differential thermal analysis for a binder system heated in air and carbon dioxide.
Figure 1:
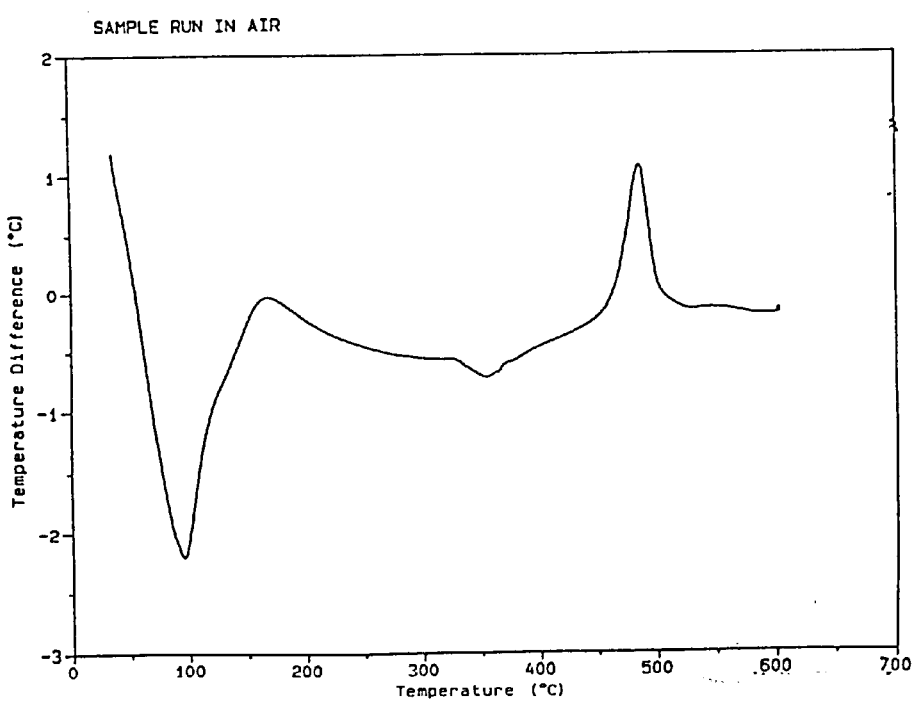

The present invention allows for rapid heating rates without damage to the ceramic by changing the nature of the oxidation process for the organic binder removal from, on balance, exothermic to slightly exothermic or neutral and more preferably to endothermic at a temperature where the organic materials will oxidize. Commonly, above about 400° C. the carbon dioxide acts as an oxidant to the organic binders but with the key difference over the prior art that such reaction is endothermic. This allows the binder removal to be well controlled because the rate of reaction is affected by the heat input and every atom of hydrogen or carbon that reacts with the carbon dioxide actually tends to absorb energy to eliminate any possibility of a thermal runaway.

The standard free energy for the reaction with carbon is positive at the oxidation temperature ranges set forth above. Hence, the use of carbon dioxide oxidizing atmospheres would not be readily apparent. However, since the products of the oxidation are removed in a flowing atmosphere, the conditions are non-standard and the endothermic oxidation is favored. For instance, depending on whether the pressure of formed carbon monoxide is 0.01 or 0.001 the free energy for the reaction between carbon and carbon dioxide can become negative at temperatures of 587° C., within the temperature range commonly used for binder removal. In fact, when the carbon dioxide content is about 1%, remainder inert gas, such temperature only reaches 613° C.

For ceramic tube manufacture, the parts should be placed in a furnace. After the furnace is closed, a purge of a carbon dioxide containing atmosphere is started and the heating is commenced. The heating rate is controlled by factors such as the thermal mass in the furnace and the need to avoid temperature imbalances larger than about 10° C. The heating is to an oxidation temperature needed to burn out substantially all the binder. As stated above, the temperature range of the oxidation temperature will broadly be between about 200° C. and about 800° C. A range of between about 450° C. and about 650° C. is more preferred. A temperature of 450° C. would produce favorable reaction rates in many common perovskites. A temperature of about 600° C. is particularly preferred as a common furnace operating temperature. The oxidation temperature can then be held for at least an hour for perovskite tubes having a wall thickness of about 1.5 mm. Time periods of between about 2 to about 10 hours are more preferred for such tubes to ensure all of the binder is removed. About 30 hours is an outside limit for such tubes to ensure all the organic binder is burned out. It is to be pointed out that for very small ceramic forms, such as experimental coupons, a time period of about 6 minutes might be sufficient. This being said the present invention encompasses processes in which at least about 90% by weight of the organic binder is removed. The idea being that during sintering, the ceramic form would remain subject to the carbon dioxide containing atmosphere to accomplish the remainder of the burn out of the organic binder materials. Generally speaking, the process can said to be conducted until at least about 99% of the organic binder is removed because a remaining 1% to be burned out during sintering in a high oxygen content atmosphere would not harm the ceramic.

Once the organic binder is removed the furnace atmosphere can be controlled to a sintering atmosphere appropriate for the particular ceramic. The sintering is continued until the desired densification is achieved. The furnace can then be cooled in the sintering atmosphere.

It is to be noted that the determination as to the extent of removal of the organic binder material is simply a matter of experimentally weighing the green ceramic before and after treatment with the knowledge of the weight of the organic binder making up the green ceramic. Further, as stated above, in order for the reaction to proceed in the first place, reaction products must be removed by a flowing carbon dioxide containing atmosphere. In order to assure that there is sufficient flow rate for such atmosphere, the concentration of reaction products in the furnace effluent can be measured. There should be no condensation of water within the furnace.

The following examples confirm different aspects of the effect of a treatment of a green ceramic form in accordance with the present invention.

EXAMPLE 1

With reference to FIG. 1, a sample consisting of a coupon containing 5.7 mg. of a perovskite containing lanthanum, strontium, iron, and chromium oxide and having a composition $La_{0.2}Sr_{0.8}Cr_{0.2}Fe_{0.8}O_3$ and 0.98 mg of an organic binder containing 29.6% methyl cellulose and 70.4% water (by weight) was heated in an atmosphere of carbon dioxide. Another sample from the same batch of the first sample and containing 9.06 mg of oxide and 1.6 mg of the organic binder was heated in air. If the two curves are compared, an initial endotherm due to dissociation of adsorbed water is observed. At between about 500° C. and about 600° C. an exotherm is observed in the case of air which means that the sample will release heat and there will be no control over temperature unless the heating of the sample is carefully set at a low rate. This lack of control of temperature will cause breakage of the ceramic during processing. When the sample was heated in carbon dioxide an endotherm rather than an exotherm was revealed.

EXAMPLE 2

Figure 2:
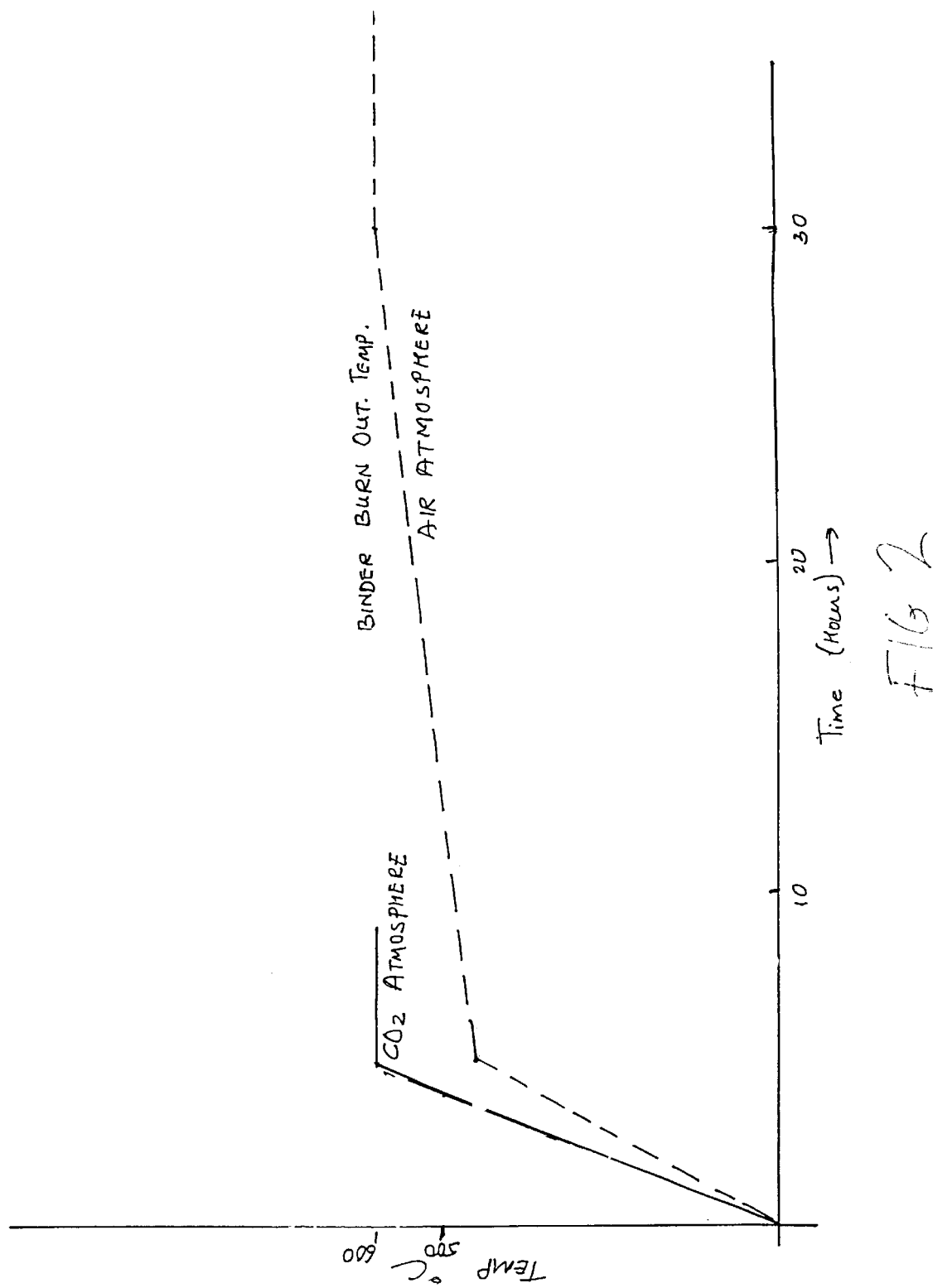
FIG. 2 is a graphical depiction of a binder removal process practiced in accordance with the present invention compared with a process of the prior art.

With reference to FIG. 2, samples consisting of $La_{0.2}Sr_{0.8}Cr_{0.2}Fe_{0.8}O_3$ were treated in a carbon dioxide atmosphere in accordance with the present invention and in air. As is apparent, the treatment in accordance with the present invention took about 10 hours as compared with the prior art which took about 96 hours to complete the binder removal process.

EXAMPLE 3

A green tube of perovskite ($La_{0.2}Sr_{0.8}Cr_{0.2}Fe_{0.8}O_3$) 1.3 cm. in diameter, 15 cm. in length and weighing about 32.6 g was made with a binder system containing 1.67 g corn oil, 0.92 g Vaseline, and 0.69 g polyethylene. The green tube was heated from room temperature to about 1000° C. at a heating rate of about 20° C./min. in an atmosphere of flowing carbon dioxide. The heating took 50 minutes and the 1000° C. temperature was held for about 10 minutes. At the conclusion of the treatment, the binder was removed and there was no evidence of any damage to the tube.

EXAMPLE 4

Closed end green tubes having a diameter of about 1.35 cm and a length of about 30 cm were made by isostatically pressing 49 g of a perovskite ($La_{0.2}Sr_{0.8}Cr_{0.2}Fe_{0.8}O_3$) with 4 wt % polyvinyl alcohol (PVA) and 1 wt % polyethylene glycol (PEG). The green tubes were heated in carbon dioxide to 650° C. at 2 c/min., held for 2 hours and then to 1275° C. at a heating rate of about 5° C./min. The heating time was about 9 hrs and the tubes were held at the temperature for about 2 hrs. The resultant tubes were crack free and were sintered to 97% of theoretical density. The finished tubes were tested for mechanical strength and found to have the same strength as tubes made by conventional processes. The tubes were then tested in oxygen transport reactors and were found to produce the same flux rate as conventionally sintered, prior art tubes.

Although the present invention has been described with reference to a preferred embodiment, as will occur to those skilled in the art, numerous changes, additions and omissions can be made without departing from the spirit and scope of the present invention.

What is claimed is:

1. A method of removing an organic binder form a green ceramic form, said method comprising:

subjecting said green ceramic form to a flowing carbon dioxide containing atmosphere having a carbon dioxide concentration of no less than about 60% by volume and a sufficiently low oxygen content to allow at least about 60% of said organic binder to be oxidized by carbon dioxide;

heating said green ceramic form at a rate greater than about 0.1° C./min to an oxidation temperature at which said organic binder will be oxidized; and maintaining said green ceramic form under oxidizing temperature conditions until at least about 90% by weight of said organic binder oxidizes and is thus, removed within said flowing carbon dioxide containing atmosphere.

2. The method of claim 1, wherein said flowing carbon dioxide containing atmosphere comprises at least about 90% carbon dioxide and no more than about 10% oxygen.

3. The method of claim 1, wherein said green ceramic form is maintained at said temperature until at least about 99% by weight of said organic binder oxidizes.

4. The method of claim 1, wherein said carbon dioxide concentration is between about 1% and about 100% by volume.

5. The method of claim 1, wherein said carbon dioxide containing atmosphere contains no more than about 30% by volume carbon dioxide.

6. The method of claim 1, wherein said green ceramic form is heated at a rate no greater than about 50° C./min.

7. The method of claim 1, wherein said green ceramic form is heated at a rate of no greater than about 20° C./min.

8. The method of claim 1, wherein said green ceramic form is heat at a rate within a range from between about 5° C./min. and about 15° C./min.

9. The method of claim 1, wherein said green ceramic form is maintained under said oxidizing temperature conditions for a time period of between about 0.1 and about 30 hours.

10. The method of claim 1, wherein said oxidation temperature is a range of between about 200° C. and about 800° C.

11. The method of claim 1, wherein said oxidation temperature is in a range of between about 450° C. and about 650° C.

12. The method of claim 1, wherein said oxidation temperature is about 600° C.

13. The method of claim 1, wherein said ceramic is formed of an oxide or mixture of oxides that conduct hydrogen or oxygen ions.

14. The method of claim 13, herein said green ceramic form is heated at a rate within a range of between about 5° C./min. and about 15° C./min.

15. The method of claim 14, wherein said oxidation temperature is about 600° C.

* * * * *